(12) United States Patent
Behrens et al.

(10) Patent No.: US 8,827,644 B2
(45) Date of Patent: Sep. 9, 2014

(54) WIND TURBINE ROTOR BLADE

(75) Inventors: Tim Behrens, Valby (DK); Damien Castaignet, København N (DK); Carsten Hein Westergaard, Houston, TX (US)

(73) Assignee: Vestas Wind Systems A/S, Aarhus N. (DK)

(*) Notice: Subject to any disclaimer, the term of this patent is extended or adjusted under 35 U.S.C. 154(b) by 491 days.

(21) Appl. No.: 13/318,011

(22) PCT Filed: Mar. 25, 2010

(86) PCT No.: PCT/EP2010/053929
§ 371 (c)(1),
(2), (4) Date: Dec. 1, 2011

(87) PCT Pub. No.: WO2010/124914
PCT Pub. Date: Nov. 4, 2010

(65) Prior Publication Data
US 2012/0068469 A1   Mar. 22, 2012

Related U.S. Application Data

(60) Provisional application No. 61/174,011, filed on Apr. 30, 2009.

(30) Foreign Application Priority Data

Apr. 30, 2009 (GB) .................................. 0907444.4

(51) Int. Cl.
*F03D 11/00* (2006.01)
(52) U.S. Cl.
USPC .......................................................... 416/24
(58) Field of Classification Search
CPC .. F03D 1/0675; B64C 11/18; F05D 2240/304
USPC .................................... 416/23, 24
See application file for complete search history.

(56) References Cited

U.S. PATENT DOCUMENTS 2,892,601 A * 6/1959 Hawkins et al. ............... 244/190
6,168,379 B1 * 1/2001 Bauer ............................. 416/23
(Continued)

FOREIGN PATENT DOCUMENTS

EP  0 283 730  9/1988
FR  2 290 585  6/1976
(Continued)

OTHER PUBLICATIONS

Pavlos Avramidis; International Preliminary Report on Patentability issued in priority International Application No. PCT/EP2010/053929; Nov. 1, 2011; 6 pages; European Patent Office.
(Continued)

*Primary Examiner* — Ninh H Nguyen
(74) *Attorney, Agent, or Firm* — Wood, Herron & Evans, LLP

(57) ABSTRACT

A wind turbine blade extending in a longitudinal direction from a root end to a tip end and defining an aerodynamic airfoil cross-section between a leading edge and a trailing edge in a chordwise direction transverse to the longitudinal direction, the aerodynamic airfoil cross-section having an effective camber in the chordwise direction; the wind turbine blade comprising: blade body; first device for modifying the aerodynamic surface or shape of the blade, the position and/or movement of the first device relative to the blade body being controlled by a first actuation mechanism; second device for modifying the effective camber of the airfoil cross section; herein, in use, the first device modifies the aerodynamic surface or shape of the blade at a frequency up to a first maximum frequency and the second device modifies the effective camber of the airfoil cross section at a frequency up to a second maximum frequency, the second maximum frequency being higher than the first maximum frequency.

21 Claims, 6 Drawing Sheets

(56) References Cited

U.S. PATENT DOCUMENTS

| | | | |
|---|---|---|---|
| 6,984,109 B2 * | 1/2006 | Bagai | 416/1 |
| 7,762,770 B2 * | 7/2010 | Sun et al. | 416/23 |
| 2009/0074573 A1 | 3/2009 | Rebsdorf et al. | |

FOREIGN PATENT DOCUMENTS

| WO | 02/38442 | 5/2002 |
|---|---|---|
| WO | 2004/088130 | 10/2004 |
| WO | 2004/099608 | 11/2004 |
| WO | 2007/045940 | 4/2007 |
| WO | 2008/003330 | 1/2008 |
| WO | 2008/132235 | 11/2008 |

OTHER PUBLICATIONS

James Paddock; Combined Search and Examination Report issued in priority Great Britain Application No. GB0907444.4; Sep. 1, 2009; 5 pages; Great Britain Intellectual Property Office.

Pavlos Avramidis; International Search Report and Written Opinion issued in priority International Application No. PCT/EP2010/053929; Feb. 14, 2011; 10 pages; European Patent Office.

* cited by examiner

WIND TURBINE ROTOR BLADE

The present invention relates to a wind turbine rotor blade. In particular it relates to wind turbine blades having devices for modifying the aerodynamic surface and camber of the blade in order to alleviate loads acting on the wind turbine rotor.

Modern wind turbines are controlled during operation in order to optimise the performance of the wind turbine in different operating conditions. The different operating conditions can arise from changes in wind speed and wind gusts which are local fast variations in wind speed. It is well known to regulate the speed of rotation of the rotor of a horizontal axis wind turbine by pitching the blades of the rotor. This is typically achieved by turning the blades about their longitudinal axis to influence the aerodynamic angle of attack of the rotor blades, this is the method used in pitch controlled wind turbine and active stall controlled wind turbines.

Wind turbines are subjected to loads of a highly variable nature due to the wind conditions. In modern wind turbines, as the rotor is typically able to control its pitch angle, the pitch can be used not only for controlling the speed of the rotor, but also for reducing the variations in load on the blades. However, due to the large length of modern wind turbine blades and the associated high inertia of the masses to be rotated about a pitch axis, the blade pitch mechanisms are not ideal for reacting rapidly to variations in wind speed which occur over a short time frame. In addition the length of wind turbine blades is increasing with new technology and the blades are becoming more flexible due to their greater length. Consequently, with the length of wind turbine blades increasing, when the blades are pitched there is a longer time lag for the pitch to change at the tip where the main loads are on the blades. Furthermore, controlling the loads on the blades with the use of a pitch system can be problematic as the blade pitch bearings become damaged with constant use.

It is possible to regulate the loads acting on the blades of a wind turbine rotor with devices which modify the aerodynamic surface or shape of the blades such as by deformable trailing edges or adjustable flaps which can include trailing edge flaps, leading edge flaps, ailerons, spoilers, slats and gurney flaps. Such aerodynamic devices are advantageous because they allow a faster response time due to their relatively low inertia as they are small compared to the size of the entire wind turbine blade. One such example of a wind turbine blade which has a deformable trailing edge is described in WO2008/132235. However, flaps themselves have their limits because they cannot alleviate all the loads as their influence on the change of lift on the blade is small.

As mentioned above, wind turbine rotors are subjected to a variety of loads. These can be generalised into two categories:
  low frequency high amplitude loads (so called 1P vibrations); and
  high frequency low amplitude loads.

The low frequency high amplitude loads arise from wind shear (the increase in speed of the wind with the height above the ground), the yaw error (a cross-flow of wind towards the rotor when the rotor axis is not aligned with the wind direction), and tower shadow (the interference caused by the retardation of the flow due to the tower on which the rotor is mounted via a nacelle). The high frequency low amplitude loads arise from turbulence and blade vibrations, for example.

A disadvantage of devices such as trailing edge flaps is that they are not efficient to alleviate the high amplitude vibrations that result from the low frequency high amplitude loads. An object of the present invention is to provide a rotor blade that can alleviate both the low frequency high amplitude loads and the high frequency low amplitude loads.

According to the present invention there is provided a wind turbine blade extending in a longitudinal direction from a root end to a tip end and defining an aerodynamic airfoil cross-section between a leading edge and a trailing edge in a chordwise direction transverse to the longitudinal direction, the aerodynamic airfoil cross-section having an effective camber in the chordwise direction; the wind turbine blade comprising:
  a blade body;
  a first device for modifying the aerodynamic surface or shape of the blade, the position and/or movement of the first device relative to the blade body being controlled by a first actuation mechanism;
  a second device for modifying the effective camber of the airfoil cross section;
  wherein, in use, the first device modifies the aerodynamic surface or shape of the blade at a frequency up to a first maximum frequency and the second device modifies the effective camber of the airfoil cross section at a frequency up to a second maximum frequency, the second maximum frequency being higher than the first maximum frequency.

The invention overcomes the problems associated with the prior art because the first device alleviates the low frequency high amplitude loads and the second device alleviates the high frequency low amplitude loads.

The camber, or mean camber line, of an airfoil section is the curvature which is defined by a line halfway between the upper and lower surfaces of the airfoil section. The camber of an airfoil section affects air flow over the airfoil and therefore the lift generated by the airfoil. However, according to the invention, if a device affects the airflow over the airfoil without changing the physical geometry of the airfoil section, it is referred to a change in the effective camber.

The second device for modifying the effective camber of the airfoil cross section may modify the aerodynamic surface or shape of the blade and the position and/or movement of the second device relative to the blade body may be controlled by a second actuation mechanism.

The first device may operate to modify the aerodynamic surface or shape of the blade at a frequency up to 1 Hz. The second device may operate to modify the effective camber of the airfoil cross section at a frequency up to 15 Hz.

The first device may have a chord length between 5% and 50% of the chord length of the wind turbine blade. The second device may have a chord length of less than 10% of the chord length of the wind turbine blade. The chord length of the first and second device refers to the distance between the edges of the devices in a chordwise direction, i.e. the distance between the front end and a rear end of each device. The second device may have a chord length of up to 50% of the chord length of the first device.

The first device and the second device may be disposed adjacent to each other on the trailing edge.

The first device and the second device form part of the trailing edge and they may be disposed separate from each other on the trailing edge.

The first device may form part of the trailing edge and the first device may surround the second device.

The first device may be a trailing edge flap or a deformable trailing edge.

The first device and the second device may have: a front end in the direction of the leading edge of the wind turbine blade and a rear end in the direction of the trailing edge of the wind turbine blade; wherein the front end of the first device is connected to the blade body for rotation relative to the blade body; and the front end of the second device is connected to the rear end of the first device for rotation relative to the first device.

The first actuation mechanism which controls position and/or movement of the first device may be a pneumatic actuation mechanism.

The first actuation mechanism which controls the position and/or movement of the first device may be a thermoelectric actuator or a shape memory alloy actuator.

The second device may be a trailing edge flap or a deformable trailing edge.

The second device may comprise a microtab arranged to project from the surface of the airfoil cross section, the microtab being located within a distance of 10% of the chord length from the trailing edge.

The second device may comprise a fluid ejection or suction means arranged to eject or suck fluid from the surface of the airfoil cross section within a distance of 10% of the chord length from the trailing edge.

The second device may comprise electrodes located on an outer surface of the wind turbine blade within a distance of 10% of the chord length from the trailing edge; wherein a voltage is applied across the electrodes to generate plasma between the electrodes.

Preferably a plurality of the first devices are provided in the longitudinal direction of the wind turbine blade. Preferably, a plurality of the second devices are provided in the longitudinal direction of the wind turbine blade.

The invention may be embodied in a wind turbine generator having at least two blades according to any one of the preceding claims. Preferably, the wind turbine generator is a horizontal axis wind turbine generator.

The invention will now be described by way of example with reference to the accompanying drawings in which.

Figure 1:
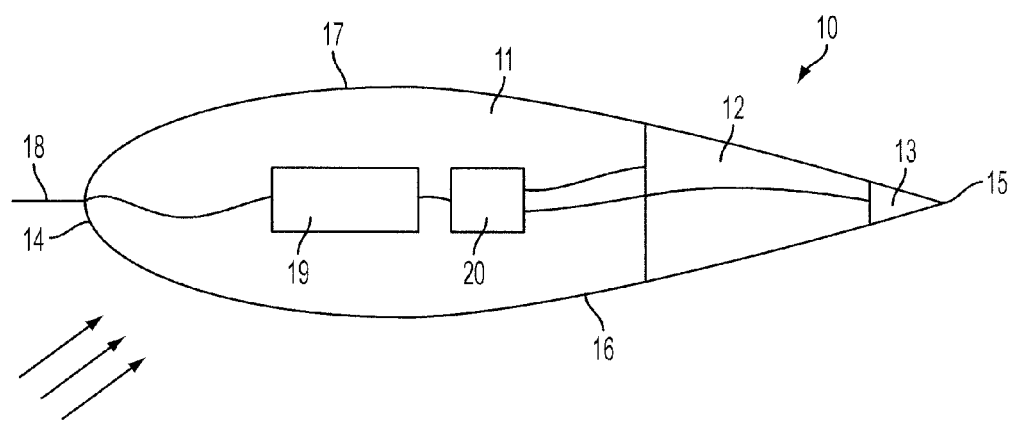
FIG. 1 illustrates a first example of a cross section of a wind turbine blade.

FIG. 1 shows a first example of a cross-section of a wind turbine blade. The blade section 10 is formed, in this first example, from a blade body 11, a slow morphing part 12 and a fast trailing edge flap 13. In this first example, the morphing part 12 is a first device and the trailing edge flap 13 is a second device. The leading edge of the blade is identified as 14, the trailing edge by 15, the pressure side by 16 and the suction side by 17. A pitot tube 18 for monitoring the local pressure, relative wind speed and angle of attack at the blade section 10 is provided at the leading edge 14 of the blade section 10. A controller 19 is provided within the blade section for signal collection from the pitot tube 18. An actuator power control unit is shown at 20 for providing power to actuators (not shown) for moving the morphing part 12 and the trailing edge flap 13.

Figure 2:
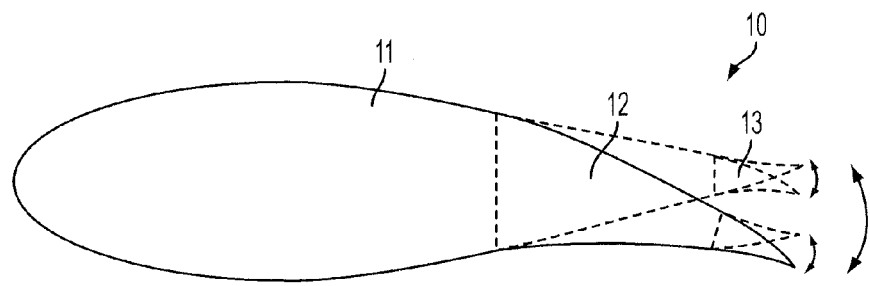
FIG. 2 illustrates a first example of a cross section of a wind turbine blade.

FIG. 2 shows how the morphing part 12 and the trailing edge flap 13 can be operated during use. The morphing part 12 deflects relative to the blade body 11 and the trailing edge flap 13 deflects relative to the morphing part 12 and the blade body 11. In the first example shown in FIG. 1 and FIG. 2, a front end of the morphing part 12 is connected directly to the blade body 11 and deflects relative to the blade body. The trailing edge flap 13 is mounted at a front end to the rear end of the morphing part 12 and deflects relative to the morphing part. The blade body 11 is a rigid part of the wind turbine blade 11 and may form part of a structural spar.

The chord length of morphing part 12 is, in this example, 30% of the chord length of the blade section 10. The chord length of the trailing edge flap 13 is, in this example, 5% of the chord length of the blade section 10. The morphing part 12 operates at a frequency of 0.1 Hz, but could operate at a frequency up to 1 Hz. The morphing part 12 operates with a range of movement of +/−15 degrees about its equilibrium position, but could operate with a range of movement of +/−25 degrees about its equilibrium position. The trailing edge flap 13 operates at frequency of up to 10 Hz with a movement of three degrees each way of its equilibrium position.

In the first example described in FIGS. 1 and 2 a morphing part 12 and a trailing edge flap 13 are shown, but other devices which cause a change in the camber or the effective camber of the blade are possible, as described in the further examples below.

The lift coefficient $C_L$ of a blade section 10 is defined as:

$$C_L = \frac{L'}{0.5 \rho V^2 C}$$

where L' is the lift force acting on the blade section 10, $\rho$ is the air density, V is the relative velocity of the blade section in the air flow and C is the chord length of the blade section.

In order to alleviate the loads acting on the local blade section 10 it is necessary to keep $C_L \times V^2$ as constant as possible. In the invention, as the relative wind speed experienced by the blade section 10 changes, the lift coefficient of the blade section is changed to compensate. This is achieved by actuating either the morphing part 12 or the trailing edge flap 13. Actuating either the morphing part 12 or the trailing edge flap 13 changes the effective camber of the blade section 10 and hence increases or decreases the local lift coefficient.

It should be noted that keeping $C_L \times V^2$ as constant as possible is a good approximation. However, it also depends on the angle of attack (alpha) of the blade, in which case it is desirable to keep L' cos(alpha)+D' sin(alpha) constant and D' cos(alpha)−L' sin(alpha) constant. (Where L' is the lift force on the local blade section and D' is the drag force on the local blade section).

Furthermore, this only refers to a local blade section. If the morphing part 12 and the trailing edge flap 13 are not provided over the span of the entire wind turbine blade, then it is desirable to keep the forces and moments acting on the entire blade as constant as possible. Therefore, the sections of the wind turbine blade with the morphing part 12 and the trailing edge flap 13 will have to compensate for the variations of loads (forces and moments) in the sections with no morphing parts 12 or trailing edge flaps 13. This means that the objective is no longer trying to keep the forces constant in the local blade sections with the morphing part 12 and the trailing edge flap 12, but instead changing the lift via the morphing part 12 and the trailing edge flap 13 to compensate to keep the forces acting on the entire wind turbine blade constant.

The controller 19 will calculate, for the current wind conditions, how the morphing part 12 and the trailing edge flap 13 should be deflected to keep the loads acting on the blade section or the entire blade constant.

Figure 3:
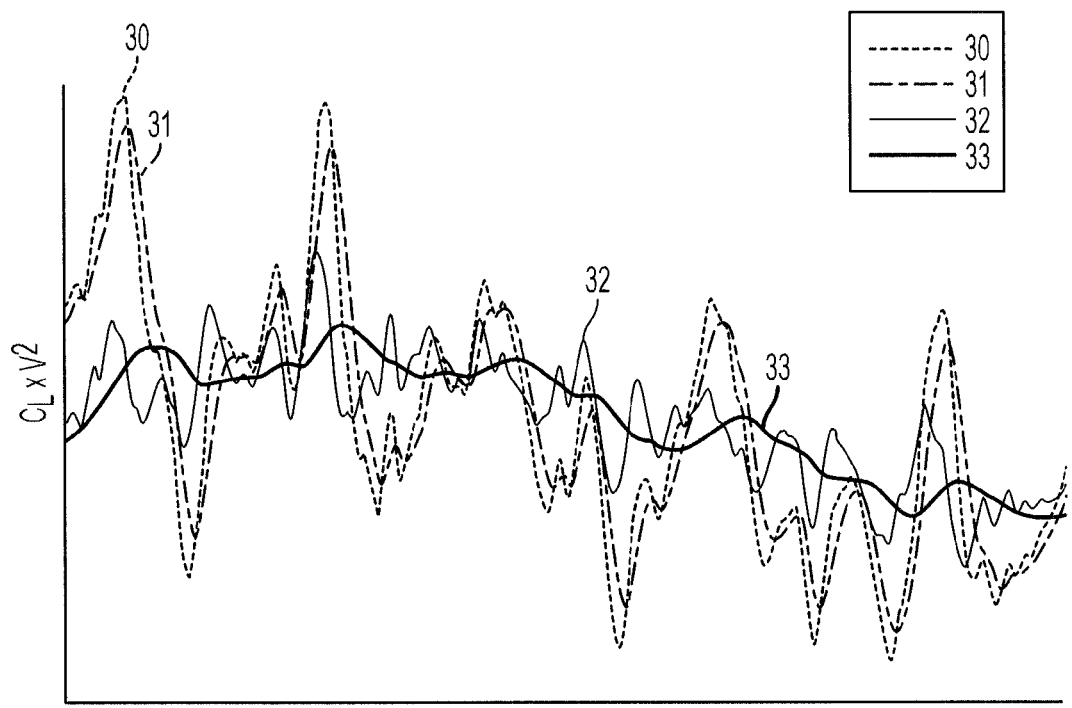
FIG. 3 is a graph illustrating the effect of the invention on the loads acting on a wind turbine rotor.

FIG. 3 shows a graph plotting time on the x axis against $C_L \times V^2$ on the y axis during normal high wind conditions:

Line 30 represents $C_L \times V^2$ against time with no morphing part 12 or trailing edge flap 13 being actuated.

Line 31 represents $C_L \times V^2$ against time with the trailing edge flap 13 being actuated and no morphing part 12 actuated.

Line 32 represents $C_L \times V^2$ against time with the morphing part 12 being actuated and no trailing edge flap 13 actuated.

Line 33 represents $C_L \times V^2$ against time with the trailing edge flap 13 being actuated and the morphing part 12 actuated.

As can be seen from FIG. 3, in normal high wind conditions, the trailing edge flaps 13 are efficient to alleviate high frequency low amplitude variations. But, the trailing edge flaps 13 are not efficient enough to alleviate high amplitude variations and as can be seen from line 31, the trailing edge flaps cannot make $C_L \times V^2$ constant during high amplitudes variations. However, these high amplitude variations have a 1P frequency and arise from wind shear, yaw error or tower shadow and are predictable. By using the morphing part 12 of the blade at a 1P frequency, these peaks are removed.

The y axis of FIG. 3 represents the parameter $C_L \times V^2$. However, this parameter could be any parameter that is alleviated, such as the wind turbine blade flap root moment, the blade mid-span moment, or the lift coefficient for the whole blade. By actuating the morphing part 12 in combination with the trailing edge flap 13 allows a better alleviation of the loads acting on the rotor. This is because the trailing edge flaps 13 are only designed to alleviate the high frequency small amplitude loads and thus they can have a small chord compared to the chord of the blade section 10 and have a small amplitude of motion—consequently they are more reliable than a large fast moving trailing edge flap with a large degree of movement. The morphing part 12 is slow moving and is thus also more reliable compared to a fast moving component having a similar chord and amplitude of motion. By 'reliable' it is meant that the morphing part 12 and the trailing edge flap 13 are able to last longer in operation in a wind turbine before they, or associated components, need to be replaced.

Figure 4:
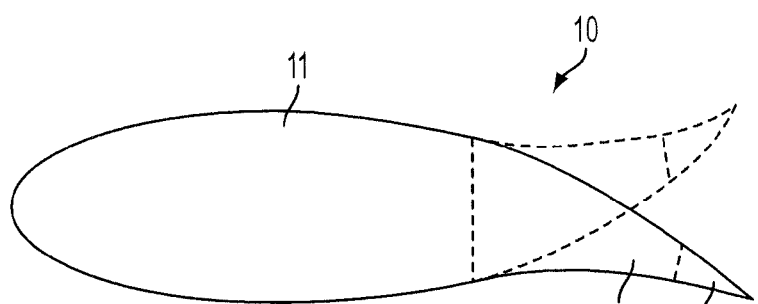
FIG. 4 illustrates a cross section of a wind turbine blade in a parked condition.

When the wind turbine is in a parked condition, that is when the rotor is not turning (for instance due to high wind) the morphing part 12 can be locked as shown in FIG. 4 and the trailing edge flap 13 is not actuated. By placing the morphing part 12 in this position, the lift of the blade section 10 is reduced so that extreme loads acting on the turbine (for instance from gusts and high wind) are reduced.

Figure 5:
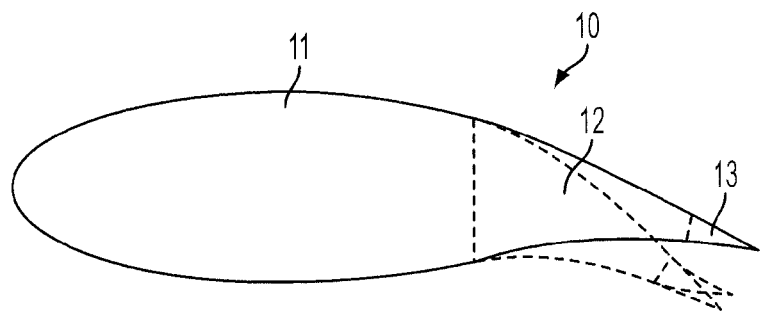
FIG. 5 illustrates a cross section of a wind turbine blade in a low speed condition.

In a wind turbine it is desirable at low wind speeds to increase the lift force generated from a blade in order to increase power production, particularly because the rotor can start turning at a lower cut in wind speed. FIG. 5 shows how the morphing part 12 is used to increase the camber line of the blade section 10 in order to obtain a high lift profile. This decreases the cut in wind speed and increases the power production. The morphing part 12 is moved to the position where it generates maximum lift (and it may be locked in this position) and the trailing edge flap 13 can also be used to alleviate small fluctuations in loads acting on the rotor.

Figure 6:
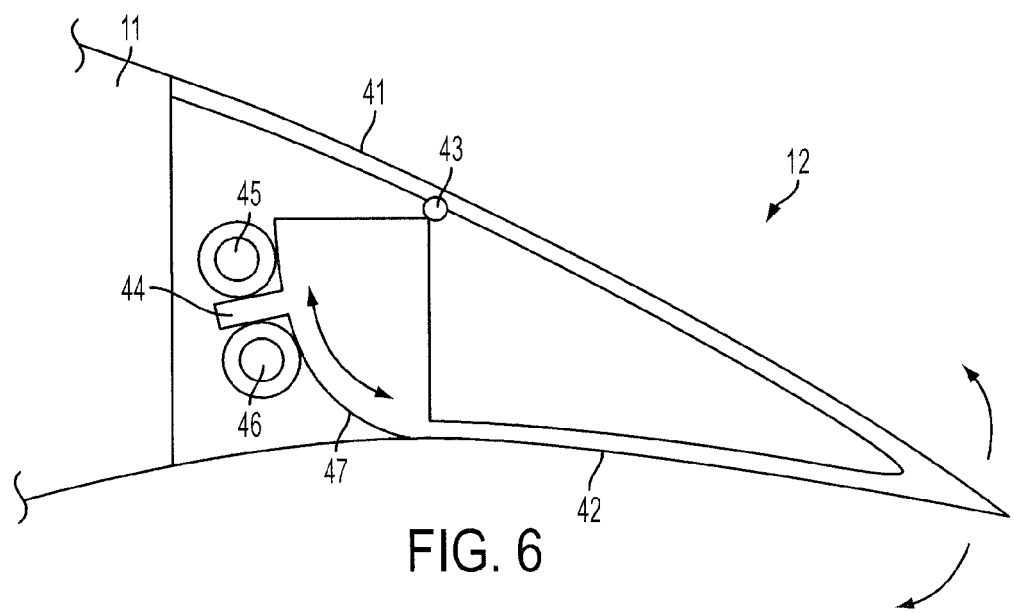
FIG. 6 illustrates an example of a pneumatic actuator in the vicinity of the trailing edge.

In this first example, the morphing part 12 is actuated by means of pneumatics as illustrated in FIG. 6 (the trailing edge flap 13 is omitted in FIG. 6 for clarity). The morphing part 12 comprises a pressure skin 41 formed from a flexible material so that the blade profile maintains a smooth upper surface when the morphing part 12 is deflected. The morphing part 12 is movably connected to the blade body 11 and can be rotated about a hinge 43. A lever element or vane 44 is disposed between two pressure chambers 45 and 46. When the chamber 45 is pressurised and the chamber 46 is depressurised, the lever element 44 is forced downwards according to the orientation in FIG. 6. This applies a rotational motion to the morphing part to deflect it upwards about the hinge 43. When the chamber 45 is depressurised and the chamber 46 is pressurised, the lever element 44 is forced upwards according to the orientation in FIG. 6. This applies a rotational motion to the morphing part to deflect it downwards about the hinge 43. As shown in FIG. 6, a radial surface 47 with its centre in the rotation hinge 43 is provided to enable the morphing part 12 to move while maintaining the continuity of the lower blade skin 42 when the morphing part is actuated. The chambers 45 and 46 may be in the form of thermoplastic hoses disposed along the longitudinal axis of the wind turbine blade.

In this first example, the trailing edge flap 13 is actuated by a motor (not shown) to cause the trailing edge flap 13 to rotate relative to the blade body 11 and relative to the morphing part 12. The trailing edge flap 13 could also be caused to deflect by means of a piezoelectric actuator.

Although the invention has been described above with reference to a morphing part 12 and a trailing edge flap 13 other configurations are possible whereby the camber or the effective camber of the blade section 10 is changed in order to increase or decrease the lift coefficient of the blade section 10, such that a first device can change the camber at a first speed or frequency and a second device can change the camber at a second speed or frequency.

Figure 7A:
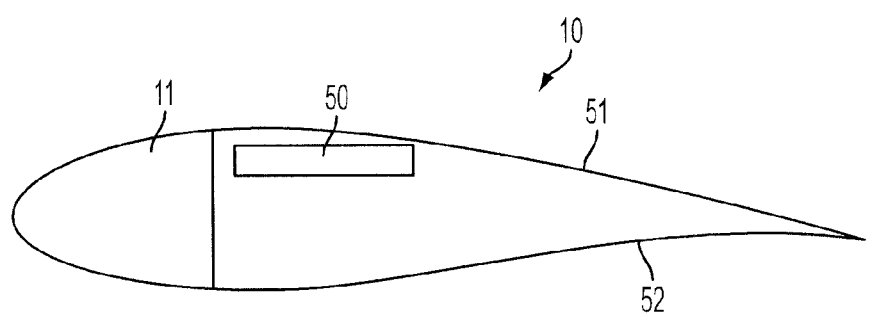
FIGS. 7a and 7b illustrate a second example of a cross section of a wind turbine blade.
Figure 7B:
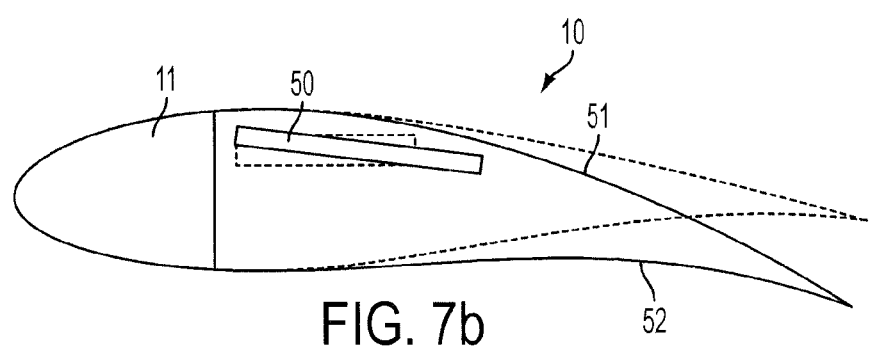

In a second example illustrated in FIGS. 7a and 7b, a thermoelectric actuator 50 is used in order to modify the aerodynamic cross section of the blade section 10—this provides the morphing part of the blade section 10 which alleviates the low frequency high amplitude loads and vibrations. In use, a voltage is applied across the thermoelectric actuator which causes it to contract (FIG. 7a) or stretch (FIG. 7b) as a current flow produces heating, which imparts large thermal stresses causing the thermoelectric actuator to change shape. An upper skin 51 and a lower skin 52 are connected by means (not shown) to the thermoelectric actuator 50 such that when the thermoelectric actuator changes shape, the blade profile changes, so that the camber of the blade section 10 changes. In this example, the thermoelectric actuator 50 and the upper and lower skins 51 and 52 form the morphing part, being the equivalent of the morphing part 12 in the first example. A shape memory alloy (SMA) could also be used to change the blade shape in place of the thermoelectric actuator.

The thermoelectric actuator 50 or SMA will modify the shape and aerodynamic surface of the blade at the same frequency as the morphing part described in FIG. 1, that is between 0.1 Hz to 1 Hz.

Figure 8:
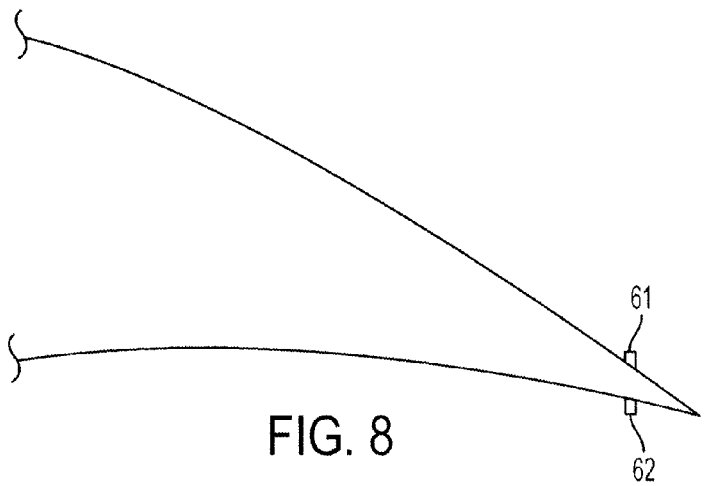
FIG. 8 illustrates a third example of a cross section of a wind turbine blade in the vicinity of the trailing edge.

FIG. 8 illustrates, in a third example, how microtabs 61 and 62 can be used in place of a trailing edge flap in order to alleviate the high frequency small amplitude loads. The microtab (or micro-electrical mechanical tab, MEM) is a small tab that projects from the blade surface in the region of the trailing edge 15. The microtab projects substantially perpendicular to the blade surface and can be actuated so that they slide out of the blade 10 and project to a height which is approximately the thickness of the boundary layer. A microtab deployment on the suction side of the blade 10 causes a decrease in the lift coefficient whereas a deployment on the pressure side causes an increase in the lift coefficient. This change in lift coefficient is due to the microtabs 61 and 62 modifying the effective camber of the blade section 10.

The microtabs 61 and 62 will modify the effective camber of the blade section 10 at the same frequency as the trailing edge flap described in FIG. 1, that is up to 10 Hz.

Figure 9A:
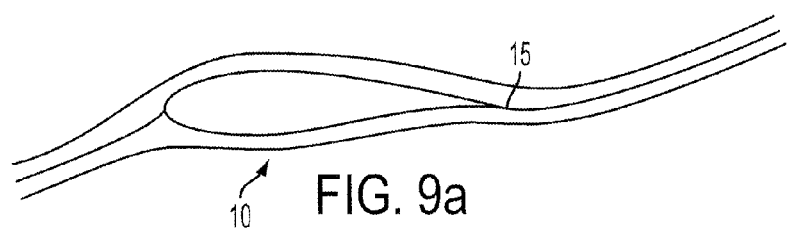
FIGS. 9a, 9b and 9c illustrate a fourth example of a cross section of a wind turbine blade in the vicinity of the trailing edge.
Figure 9B:
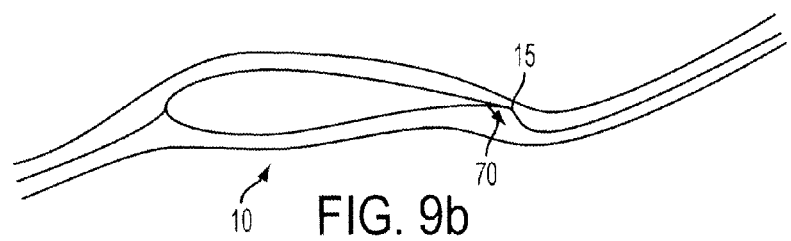
Figure 9C:
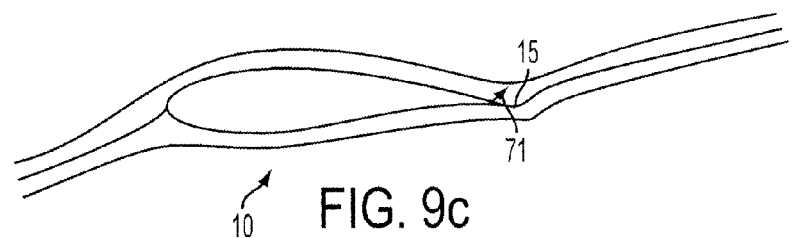

FIGS. 9a, 9b and 9c show, in a fourth example, how jets 70 and 71 are used in place of a trailing edge flap in order to alleviate the high frequency small amplitude loads. A hole (not shown) is provided in the vicinity of the trailing edge 15 of the blade section 10 through which a jet of air is ejected or blown in order to modify the effective camber of the blade section. FIG. 9a illustrates typical streamline around the blade section in a reference case without blowing. FIG. 9b illustrates the jet 70 on the pressure side of the blade section 10 blowing and it can be seen that the effective camber line is shifted to generate higher lift. FIG. 9c illustrates the jet 71 on the suction side of the blade section 10 blowing and the effective camber line is shifted to generate lower lift. It is also possible to modify the effective camber line by using suction instead of jets.

The jets 70 and 71 will modify the effective camber of the blade section 10 at the same frequency as the trailing edge flap described in FIG. 1, that is up to 10 Hz.

Figure 10A:
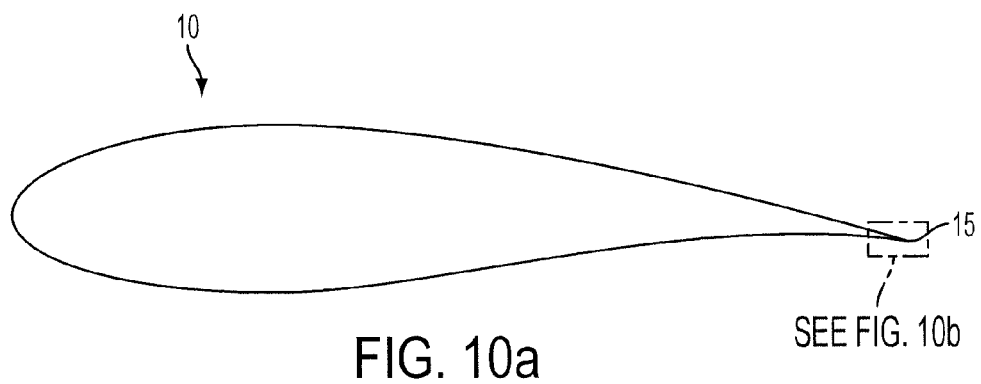
FIGS. 10a and 10b illustrate a fifth example of a cross section of a wind turbine blade.
Figure 10B:
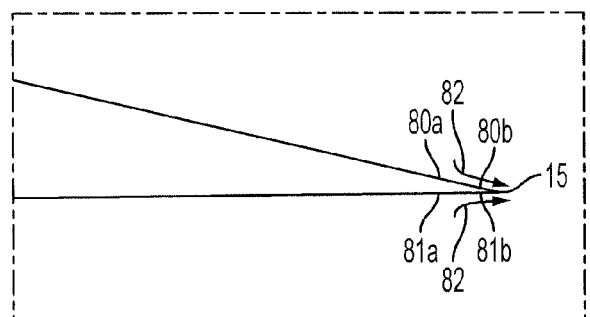

In another example, a plasma actuator may be used in place of the trailing edge flap 13. Plasma actuators generate an "electric wind" between their electrodes. As seen in FIGS. 10a and 10b in a fifth example, electrodes 80a and 80b are provided on the suction side of the blade section in the vicinity of the trailing edge and electrodes 81a and 82b are provided on the pressure side of the blade section in the vicinity of the trailing edge. When a voltage is applied between electrodes 80a and 80b and 81a and 81b respectively, a plasma is formed generating an "electric wind" as illustrated by arrows 82 which will affect the lift generation of the blade section 10 by modifying the effective camber line. The electrodes are shown in FIGS. 10a and 10b in the vicinity of the trailing edge, but they could also be provided at the forward end (i.e. towards the leading edge direction) of the morphing part 12.

The plasma generated by the electrodes will modify the effective camber of the blade section 10 at the same frequency as the trailing edge flap described in FIG. 1, that is up to 10 Hz.

FIGS. 11a to 11e illustrate examples of the arrangement of the morphing part 12 and the trailing edge flap 13 on a rotor blade 1. The rotor blade 1 has a root end 2 which is connected to a hub (not shown) of a wind turbine nacelle and a tip end 3.

Figure 11A:
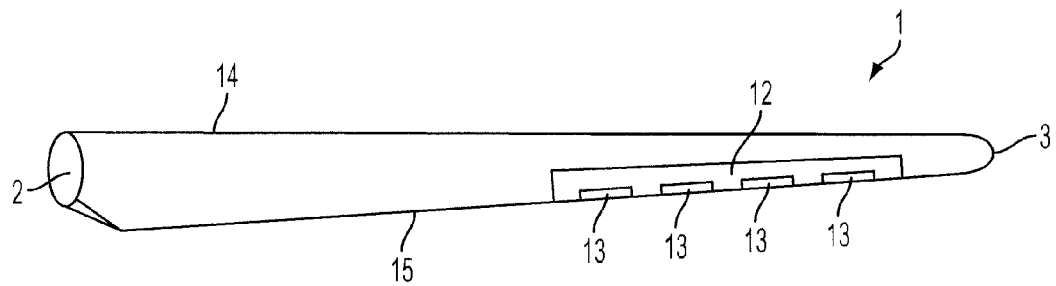
FIGS. 11a, 11b, 11c, 11d and 11e illustrate a plan view of a wind turbine blade in different configurations.
Figure 11B:
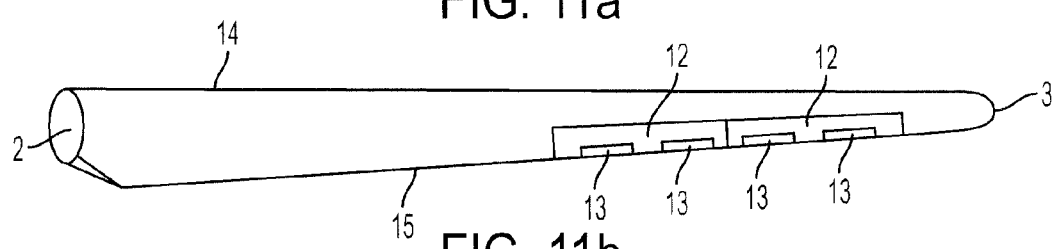
Figure 11C:
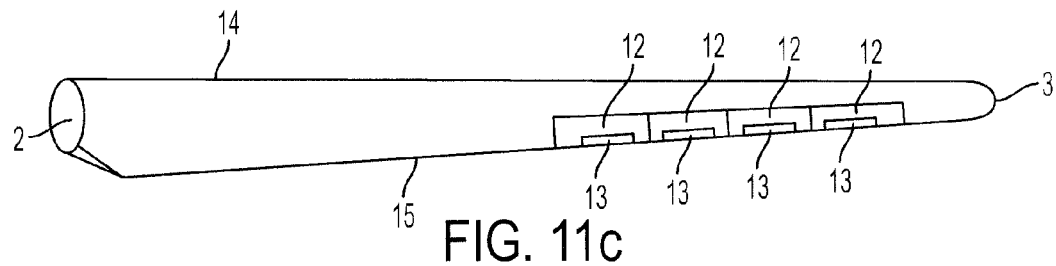
Figure 11D:
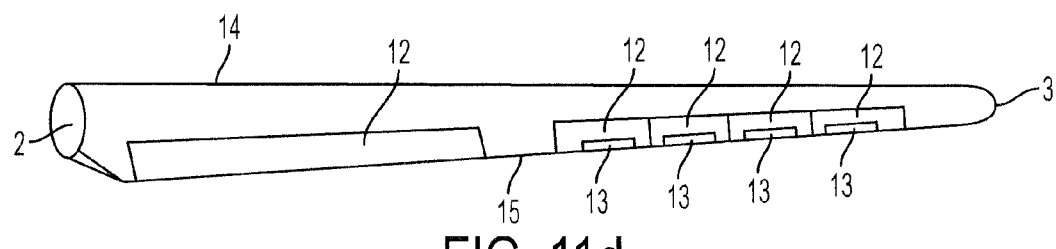

FIG. 11a illustrates one morphing part 12 with four trailing edge flaps 13. FIG. 11b illustrates two morphing parts 12 each surrounding two trailing edge flaps 13. FIG. 11c illustrates four morphing parts 12 each surrounding one trailing edge flap 13. FIG. 11d illustrates one morphing part 12 near the root end 2 of the blade 1 with four morphing parts 12 each surrounding one trailing edge flap 13 near the tip end 3 of the blade 1. The zones between the morphing parts 12 and the trailing edge flaps 13 have smooth transitions which are provided by a flexible skin material such as rubber or silicone. A flexible overlapping geometry between the morphing parts 12 and the trailing edge flaps 13 may also be provided.

Figure 11E:
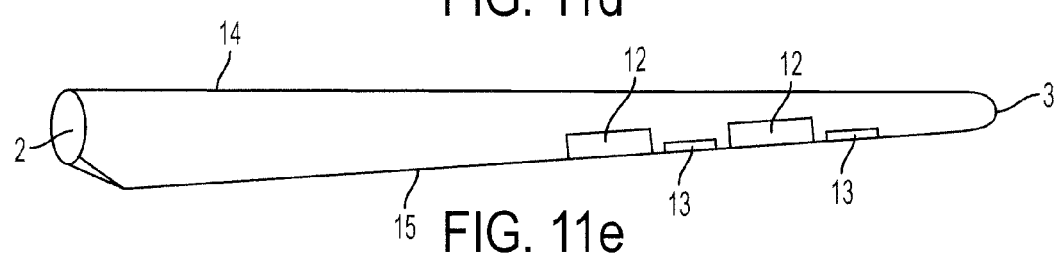

In FIGS. 11a to 11d, the trailing edge flaps 13 are shown to be surrounded by the morphing part 12. However the morphing part 12 and the trailing edge flap 13 may be separated by placing them side by side along the trailing edge of the blade 1 as shown in FIG. 11e, but the part of the blade 1 where the trailing edge flap 13 is placed should be affected by the geometry of the blade resulting from the morphing part 12 to still have the combined action of fast and slow moving actuation. The trailing edge flap 13 integration into the morphing part 12 may be similar to the integration into the normal blade body 11, since the morphing part 12 should actuate on the bigger structure of the blade body 11.

Although FIGS. 11a to 11e have been described with reference to the morphing part 12 and the trailing edge flap 13, these can be replaced with any of the other examples described in relation to FIG. 7, 8, 9 or 10.

The invention claimed is:

1. A wind turbine blade extending in a longitudinal direction from a root end to a tip end and defining an aerodynamic airfoil cross-section between a leading edge and a trailing edge in a chordwise direction transverse to the longitudinal direction, the aerodynamic airfoil cross-section having an effective camber in the chordwise direction;

the wind turbine blade comprising:
a blade body;
a first device for modifying the aerodynamic surface or shape of the blade, the position and/or movement of the first device relative to the blade body being controlled by a first actuation mechanism;
a second device for modifying the effective camber of the airfoil cross section;
wherein, in use, the first device modifies the aerodynamic surface or shape of the blade at a frequency up to a first maximum frequency and the second device modifies the effective camber of the airfoil cross section at a frequency up to a second maximum frequency, the second maximum frequency being higher than the first maximum frequency.

2. The wind turbine blade according to claim 1, wherein the second device for modifying the effective camber of the airfoil cross section modifies the aerodynamic surface or shape of the blade;
the position and/or movement of the second device relative to the blade body being controlled by a second actuation mechanism.

3. The wind turbine blade according to claim 1, wherein the first device modifies the aerodynamic surface or shape of the blade at a frequency up to I Hz.

4. The wind turbine blade according to claim 1, wherein the second device modifies the effective camber of the airfoil cross section at a frequency up to 15 Hz.

5. The wind turbine blade according to claim 1, wherein the first device has a chord length between 5% and 50% of the chord length of the wind turbine blade.

6. The wind turbine blade according to claim 1, wherein the second device has a chord length of less than 10% of the chord length of the wind turbine blade.

7. The wind turbine blade according to claim 1, wherein the second device has a chord length of up to 50% of the chord length of the first device.

8. The wind turbine blade according to claim 1, wherein the first device and the second device are disposed adjacent to each other on the trailing edge.

9. The wind turbine blade according to claim 1, wherein the first device and the second device form part of the trailing edge and they are disposed separate from each other on the trailing edge.

10. The wind turbine blade according to claim 1, wherein the first device forms part of the trailing edge and the first device surrounds the second device.

11. The wind turbine blade according to claim 1, wherein the first device is a trailing edge flap or a deformable trailing edge.

12. The wind turbine blade according to claim 11, the first device and the second device having:
- a front end in the direction of the leading edge of the wind turbine blade and a rear end in the direction of the trailing edge of the wind turbine blade;
- wherein the front end of the first device is connected to the blade body for rotation relative to the blade body; and
- the front end of the second device is connected to the rear end of the first device for rotation relative to the first device.

13. The wind turbine blade according to claim 11, wherein the first actuation mechanism which controls position and/or movement of the first device is a pneumatic actuation mechanism.

14. The wind turbine blade according to claim 11, wherein the first actuation mechanism which controls the position and/or movement of the first device is a thermoelectric actuator or a shape memory alloy actuator.

15. The wind turbine blade according to claim 1, wherein the second device is a trailing edge flap or a deformable trailing edge.

16. The wind turbine blade according to claim 1, wherein the second device comprises a microtab arranged to project from the surface of the airfoil cross section, the microtab being located within a distance of 10% of the chord length from the trailing edge.

17. The wind turbine blade according to claim 1, wherein the second device comprises fluid ejection or suction means arranged to eject or suck fluid from the surface of the airfoil cross section within a distance of 10% of the chord length from the trailing edge.

18. The wind turbine blade according to claim 1, wherein the second device comprises electrodes located on an outer surface of the wind turbine blade within a distance of 10% of the chord length from the trailing edge;
- wherein a voltage is applied across the electrodes to generate plasma between the electrodes.

19. The wind turbine blade according to claim 1, wherein a plurality of the first devices are provided in the longitudinal direction of the wind turbine blade.

20. The wind turbine blade according to claim 1, wherein a plurality of the second devices are provided in the longitudinal direction of the wind turbine blade.

21. A wind turbine generator having at least two blades according to claim 1.

* * * * *

UNITED STATES PATENT AND TRADEMARK OFFICE
CERTIFICATE OF CORRECTION

Page 1 of 1

PATENT NO. : 8,827,644 B2
APPLICATION NO. : 13/318011
DATED : September 9, 2014
INVENTOR(S) : Tim Behrens et al.

It is certified that error appears in the above-identified patent and that said Letters Patent is hereby corrected as shown below:

In the specification

Column 4, Line 59
"blade section)." should be -- blade section.) --

Column 5, Lines 3-4
"with the morphing part 12 and the trailing edge flap 12," should be -- with the morphing part 12 and the trailing edge flap 13 --

Column 5, Lines 27-28
"during high amplitudes variations." should be -- during high amplitude variations. --

In the claims

CLAIM 3
Column 8, Line 42
"at a frequency up to I Hz." should be -- at a frequency up to 1 Hz. --

Signed and Sealed this
Tenth Day of November, 2015

Michelle K. Lee
*Director of the United States Patent and Trademark Office*